(12) United States Patent
Shimazawa et al.

(10) Patent No.: US 8,111,591 B2
(45) Date of Patent: Feb. 7, 2012

(54) HEAT-ASSISTED MAGNETIC RECORDING HEAD HAVING LASER DIODE OVERLAPING TWO RECORDING WIRING LAYERS

(75) Inventors: Koji Shimazawa, Tokyo (JP); Tomohito Mizuno, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 311 days.

(21) Appl. No.: 12/458,954

(22) Filed: Jul. 28, 2009

(65) Prior Publication Data
US 2011/0026378 A1  Feb. 3, 2011

(51) Int. Cl.
*G11B 11/00* (2006.01)

(52) U.S. Cl. ............ 369/13.33; 369/13.13; 360/59

(58) Field of Classification Search ........... 369/13.33, 369/13.32, 13.13, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | |
|---|---|---|
| 2007/0274004 A1 | 11/2007 | Kobayashi et al. |
| 2008/0002298 A1 | 1/2008 | Sluzewski |
| 2008/0043360 A1 | 2/2008 | Shimazawa et al. |
| 2008/0158709 A1* | 7/2008 | Tanaka et al. ............. 369/13.33 |
| 2008/0205202 A1* | 8/2008 | Komura et al. ............ 369/13.33 |
| 2011/0026156 A1* | 2/2011 | Shimazawa et al. ....... 369/13.33 |
| 2011/0026379 A1* | 2/2011 | Shimazawa et al. ....... 369/13.33 |

FOREIGN PATENT DOCUMENTS

JP    A-2007-200475    8/2007

* cited by examiner

*Primary Examiner* — Tan X Dinh
(74) *Attorney, Agent, or Firm* — Oliff & Berridge, PLC

(57) ABSTRACT

A heat-assisted magnetic recording head includes a slider, and an edge-emitting laser diode fixed to the slider. The slider includes: a substrate; and an MR element, two reproduction wiring layers, a coil, two recording wiring layers, a magnetic pole, a near-field light generating element, and a waveguide that are stacked above the top surface of the substrate. The two reproduction wiring layers supply a sense current to the MR element. The two recording wiring layers supply a coil current to the coil, The laser diode has an emitting end face including an emission part for emitting laser light, and a bottom surface, The laser diode is arranged so that the bottom surface faces the top surface of the slider. As viewed from above, the laser diode does not overlap the two reproduction wiring layers but overlaps at least one of the two recording wiring layers.

10 Claims, 8 Drawing Sheets

HEAT-ASSISTED MAGNETIC RECORDING HEAD HAVING LASER DIODE OVERLAPING TWO RECORDING WIRING LAYERS

BACKGROUND OF THE INVENTION

1. Field of the Invention

The present invention relates to a heat-assisted magnetic recording head for use in heat-assisted magnetic recording where a magnetic recording medium is irradiated with near-field light to lower the coercivity of the magnetic recording medium for data recording, and to a head gimbal assembly and a magnetic recording device each of which includes the heat-assisted magnetic recording head.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) intended for reading and a recording head including an induction-type electromagnetic transducer intended for writing are stacked on a substrate. Examples of the MR element include a giant magnetoresistive (GMR) element and a tunneling magnetoresistive (TMR) element. The recording head has a coil and a magnetic pole. The coil produces a magnetic field corresponding to data to be recorded on the magnetic recording medium. The magnetic pole allows a magnetic flux corresponding to the magnetic field produced by the coil to pass, and produces a recording magnetic field for recording data on the magnetic recording medium. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data recording with existing magnetic heads.

To solve the foregoing problems, there has been proposed a technique so-called heat-assisted magnetic recording. This technique uses a magnetic recording medium having high coercivity. When recording data, a magnetic field and heat are simultaneously applied to the area of the magnetic recording medium where to record data, so that the area rises in temperature and drops in coercivity for data recording. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

In general, laser light that is used for generating near-field light is guided through a waveguide that is provided in the slider to the plasmon antenna that is located near the medium facing surface of the slider. Possible techniques of placement of a light source that emits the laser light are broadly classified into the following two. A first technique is to place the light source away from the slider. A second technique is to fix the light source to the slider.

The first technique is described in JP 2007-200475 A, for example. The second technique is described in U.S. Patent Application Publication No. 2008/0002298 A1 and U.S. Patent Application Publication No. 2008/0043360 A1, for example.

The first technique requires an optical path of extended length including such optical elements as a mirror, lens, and optical fiber in order to guide the light from the light source to the waveguide. This causes the problem of increasing energy loss of the light in the path. The second technique is free from the foregoing problem since the optical path for guiding the light from the light source to the waveguide is short.

The second technique, however, has the following problem. Hereinafter, the problem that can occur with the second technique will be described in detail. The second technique typically uses a laser diode as the light source. The laser diodes available include edge-emitting laser diodes and surface-emitting laser diodes. In an edge-emitting laser diode, the emission part for emitting the laser light is located in an end face that lies at an end of the laser diode in a direction parallel to the plane of an active layer. The emission part emits the laser light in the direction parallel to the plane of the active layer. In a surface-emitting laser diode, the emission part for emitting the laser light is located in a surface that lies at an end of the laser diode in a direction perpendicular to the plane of the active layer. The emission part emits the laser light in the direction perpendicular to the plane of the active layer.

The laser light emitted from a laser diode can be made incident on the waveguide by a technique described in U.S. Patent Application Publication No. 2008/0002298 A1, for example. This publication describes arranging a surface-emitting laser diode with its emission part opposed to the surface of the slider on the trailing side so that the laser light emitted from the emission part is incident on the waveguide from above. Surface-emitting laser diodes, however, typically have a lower optical output as compared with edge-emitting laser diodes. The technique therefore has the problem that it is difficult to provide laser light of sufficiently high intensity for use in generating near-field light.

The laser light emitted from a laser diode may be made incident on the waveguide by other techniques. For example, U.S. Patent Application Publication No. 2008/0043360 A1 describes a technique in which the incident end face of the waveguide is arranged at the surface opposite to the medium facing surface of the slider, and the laser diode is arranged with its emission part opposed to this incident end face so that the laser light emitted from the emission part is incident on the incident end face of the waveguide without the intervention of any optical element. This technique allows the use of an edge-emitting laser diode which has a high optical output. However, this technique has the problem that it is difficult to align the emission part of the laser diode with respect to the incident end face of the waveguide with high precision, since the position of the emission part of the laser diode can vary within a plane perpendicular to the optical axis of the waveguide.

To cope with this, the edge-emitting laser diode may be fixed to the top surface of the slider that lies at an end of the slider above the top surface of the substrate, so that the laser light is emitted in a direction parallel to the top surface of the slider, while arranging the waveguide so that the incident end face of the waveguide is opposed to the emission part of the laser diode. This configuration, however, has been found to have the following problem.

The laser diode generates heat during operation. When the MR element used in the reproducing head is subjected to heat, there occurs the problem that the MR element varies in resistance to suffer degradation in characteristics, and becomes breakable to suffer a decrease in life. In particular, a TMR element can easily suffer a dielectric breakdown across its thin tunnel barrier layer when subjected to heat. If an edge-emitting laser diode is fixed to the top surface of the slider as described above, much of the heat generated by the laser diode is transferred to the substrate of large volume and then transferred from the substrate to the magnetic recording medium. Much of the heat generated by the laser diode is thus released to the outside of the slider. Here, the part of the slider lying over the top surface of the substrate will be referred to as a head unit. The head unit includes the reproducing head and the recording head. Suppose that the laser diode is arranged so as not to overlap the MR element as viewed from above the top surface of the slider. In this case, the heat generated by the laser diode will not reach the MR element unless the heat spreads in the head unit in directions parallel to the top surface of the substrate. Actually, however, the heat generated by the laser diode spreads in the head unit in directions parallel to the top surface of the substrate, so that the heat reaches the MR element. This results in the above-mentioned problem associated with heat.

Moreover, the following two problems occur if two reproduction wiring layers, which are intended for supplying the MR element with a sense current for detecting a magnetic signal, are interposed at least in part between the bottom surface of the laser diode and the top surface of the substrate. The first problem is that the heat generated by the laser diode is transferred to the MR element through the reproduction wiring layers, thereby causing the above-mentioned problem associated with heat. The second problem is that a stray capacitance arises between the reproduction wiring layers and a conductive layer that is connected to an electrode that constitutes the bottom surface of the laser diode. The stray capacitance degrades the characteristics of the reproduction signal obtained by the MR element. In particular, if the MR element is a TMR element, which has a high resistance of 500Ω or above, the resistance component of the TMR element and the stray capacitance on the order of several picofarads combine to form a low-pass filter. This consequently degrades the high-frequency characteristics of the reproduction signal.

OBJECT AND SUMMARY OF THE INVENTION

It is an object of the present invention to provide a heat-assisted magnetic recording head that allows heat generated by an edge-emitting laser diode disposed on the top surface of the slider to be effectively transferred to the substrate of the slider while suppressing adverse effects of the laser diode on the magnetoresistive element, and to provide a head gimbal assembly and a magnetic recording device each of which includes the heat-assisted magnetic recording head.

A heat-assisted magnetic recording head according to the present invention includes a slider, and an edge-emitting laser diode fixed to the slider. The slider includes: a medium facing surface that faces a magnetic recording medium; a magnetoresistive element; two reproduction wiring layers; a coil; two recording wiring layers; a magnetic pole; a waveguide; a near-field light generating element; and a substrate.

The magnetoresistive element detects a magnetic signal sent from the magnetic recording medium. The two reproduction wiring layers supply the magnetoresistive element with a sense current for detection of the magnetic signal. The coil produces a magnetic field corresponding to data to be recorded on the magnetic recording medium. The two recording wiring layers supply, the coil with a coil current for production of the magnetic field corresponding to the data. The magnetic pole has an end face located in the medium facing surface, allows a magnetic flux corresponding to the magnetic field produced by the coil to pass, and produces a recording magnetic field for recording the data on the magnetic recording medium. The waveguide allows propagation of light emitted from the laser diode. The near-field light generating element has a near-field light generating part located in the medium facing surface. A surface plasmon is excited based on the light that propagates through the waveguide. The surface plasmon propagates to the near-field light generating part, and the near-field light generating part generates near-field light based on the surface plasmon. The substrate has a top surface. The magnetoresistive element, the reproduction wiring layers, the coil, the recording wiring layers, the magnetic pole, the near-field light generating element, and the waveguide are stacked above the top surface of the substrate.

The slider has a top surface that lies at an end above the top surface of the substrate. The laser diode includes: an active layer; an emitting end face that lies at an end in a direction parallel to a plane of the active layer and includes an emission part for emitting laser light; and a bottom surface that lies at an end in a direction perpendicular to the plane of the active layer. The laser diode is arranged so that the bottom surface faces the top surface of the slider. As viewed from above, the laser diode does not overlap the two reproduction wiring layers but overlaps at least one of the two recording wiring layers. According to the present invention, it is thus possible to transfer the heat generated by the laser diode to the substrate effectively while hindering the heat generated by the laser diode from reaching the magnetoresistive element.

In the heat-assisted magnetic recording head according to the present invention, the overlapping portion of the at least one of the two recording wiring layers with the laser diode as viewed from above may have a width greater than that of each of the two reproduction wiring layers. This facilitates the transfer of the heat generated by the laser diode to the substrate and thus enhances the foregoing advantageous effect as compared with the case where the two recording wiring layers have widths equal to those of the two reproduction wiring layers.

In the heat-assisted magnetic recording head according to the present invention, the overlapping portion of the at least one of the two recording wiring layers with the laser diode as viewed from above may have an area equal to or greater than a half that of the bottom surface of the laser diode. This enhances the foregoing advantageous effect.

In the heat-assisted magnetic recording head according to the present invention, the magnetoresistive element may be a tunneling magnetoresistive element. This significantly enhances the foregoing advantageous effect.

In the heat-assisted magnetic recording head according to the present invention, the laser diode may further include an electrode that has a bottom surface constituting at least a part of the bottom surface of the laser diode, and the slider may further include a conductive layer that is in contact with and electrically connected to the electrode. In such a case, it is possible to avoid the occurrence of a stray capacitance between the conductive layer and the two reproduction wiring layers. This can prevent the reproduction signal obtained by the magnetoresistive element from deteriorating in characteristics due to a stray capacitance.

In the heat-assisted magnetic recording head according to the present invention, the slider may further include: two reproduction terminals that are disposed on the top surface of the slider and electrically connected to the two reproduction wiring layers; and two recording terminals that are disposed on the top surface of the slider and electrically connected to the two recording wiring layers.

In the heat-assisted magnetic recording head according to the present invention, the waveguide may have an incident end face opposed to the emission part of the laser diode.

In the heat-assisted magnetic recording head according to the present invention, the waveguide may have an outer surface, and the near-field light generating element may have a coupling part opposed to the outer surface of the waveguide. The slider may further include a buffer layer that has a refractive index lower than that of the waveguide and is interposed between the coupling part and the outer surface of the waveguide. Here, a surface plasmon is excited on the coupling part through coupling with evanescent light occurring from an interface between the waveguide and the buffer layer. The surface plasmon propagates to the near-field light generating part, and the near-field light generating part generates the near-field light based on the surface plasmon.

A head gimbal assembly according to the present invention includes: the heat-assisted magnetic recording head according to the present invention; and a suspension that supports the heat-assisted magnetic recording head. A magnetic recording device according to the present invention includes: a magnetic recording medium; the heat-assisted magnetic recording head according to the present invention; and a positioning device that supports the heat-assisted magnetic recording head and positions the same with respect to the magnetic recording medium.

In the heat-assisted magnetic recording head, the head gimbal assembly, and the magnetic recording device according to the present invention, the edge-emitting laser diode is arranged so that its bottom surface lying at an end in the direction perpendicular to the plane of the active layer faces the top surface of the slider. The laser diode, as viewed from above, does not overlap the two reproduction wiring layers but overlaps at least one of the two recording wiring layers. Consequently, according to the present invention, it is possible to transfer the heat generated by the laser diode to the substrate effectively while suppressing adverse effects of the laser diode on the magnetoresistive element, as described above.

Other and further objects, features and advantages of the present invention will appear more fully from the following description.

DETAILED DESCRIPTION OF THE PREFERRED EMBODIMENT

Figure 6:
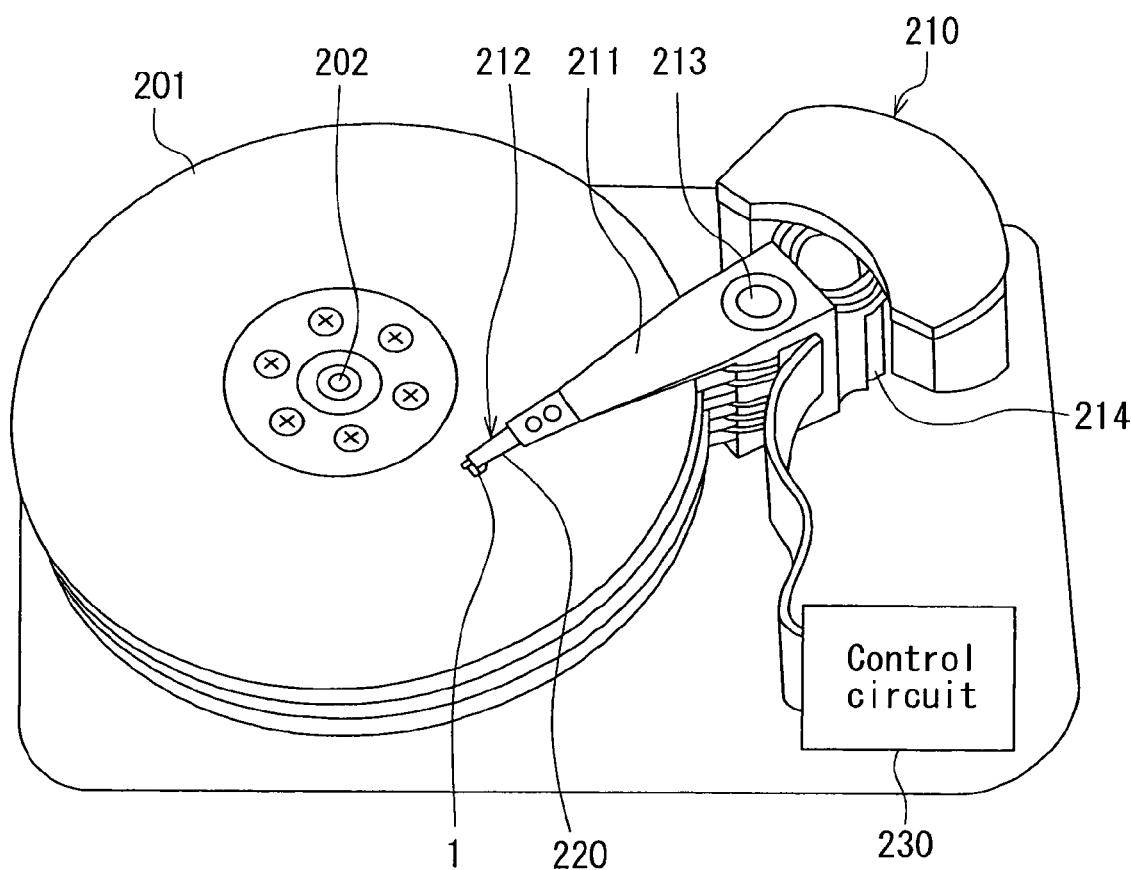
FIG. 6 is a perspective view showing a magnetic recording device according to the embodiment of the invention.

A preferred embodiment of the present invention will now be described in detail with reference to the drawings. Reference is first made to FIG. 6 to describe a magnetic disk drive as a magnetic recording device according to the embodiment of the invention. As shown in FIG. 6, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device according to the present invention is not structurally limited to the magnetic disk drive having the above-described configuration. For example, the magnetic recording device according to the present invention may be provided with a single magnetic disk 201, a single driving arm 211, a single head gimbal assembly 212 and a single heat-assisted magnetic recording head 1.

The magnetic disk drive further includes a control circuit 230 for controlling the recording and reproducing operations of the heat-assisted magnetic recording heads 1 and also for controlling the light emitting operation of a laser diode serving as a light source for generating laser light for heat-assisted magnetic recording described later.

Figure 7:
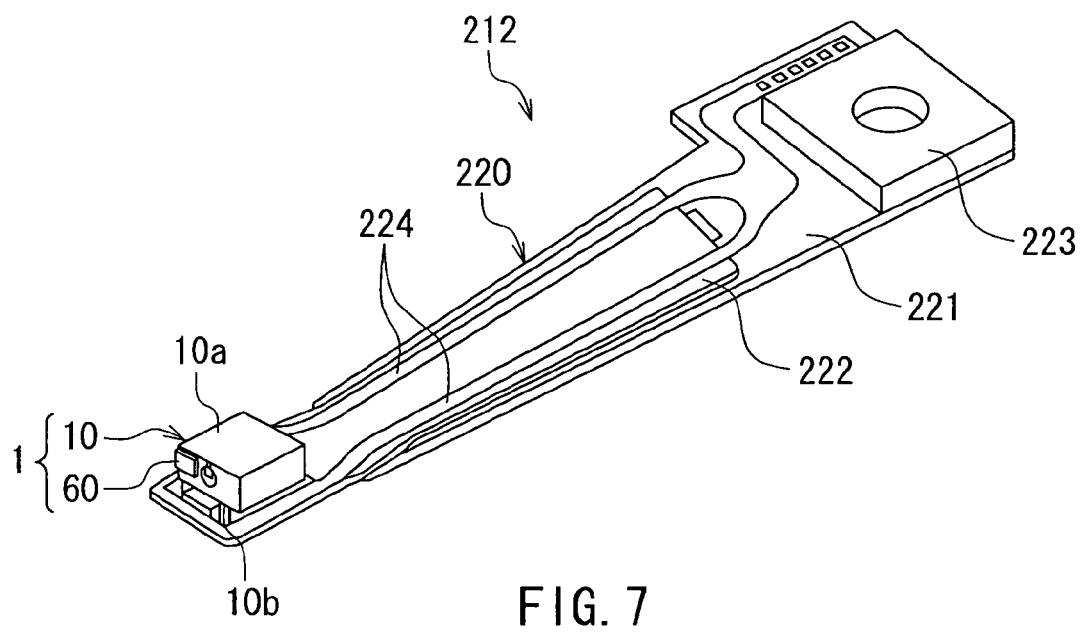
FIG. 7 is a perspective view showing a head gimbal assembly according to the embodiment of the invention.

FIG. 7 is a perspective view of the head gimbal assembly 212 of FIG. 6. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged at the base part of the load beam 221.

The assembly carriage device 210 and the suspension 220 correspond to the positioning device according to the present invention. The head gimbal assembly according to the present invention is not limited to the one having the configuration shown in FIG. 7. For example, the head gimbal assembly according to the present invention may have an IC chip for driving the head that is mounted somewhere along the suspension 220.

The heat-assisted magnetic recording head 1 according to the present embodiment will now be described in detail. As shown in FIG. 7, the heat-assisted magnetic recording head 1 includes a slider 10, and an edge-emitting laser diode 60 fixed to the slider 10. The slider 10 is nearly hexahedron-shaped, and has a medium facing surface 10a that faces the magnetic recording medium, a rear surface 10b opposite to the medium facing surface 10a, and four surfaces that connect the medium facing surface 10a to the rear surface 10b.

Figure 1:
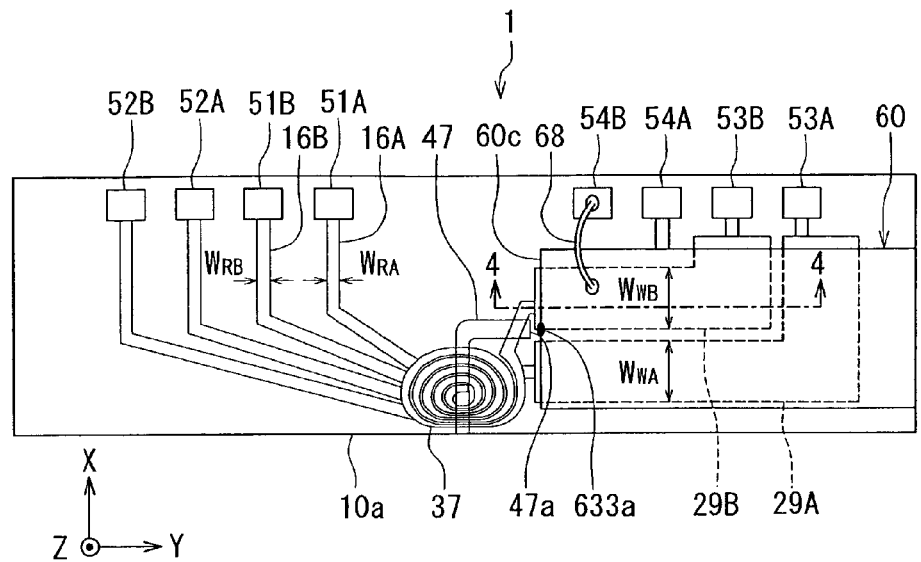
FIG. 1 is an explanatory diagram showing the layout of the main part of a heat-assisted magnetic recording head according to an embodiment of the invention.
Figure 2:
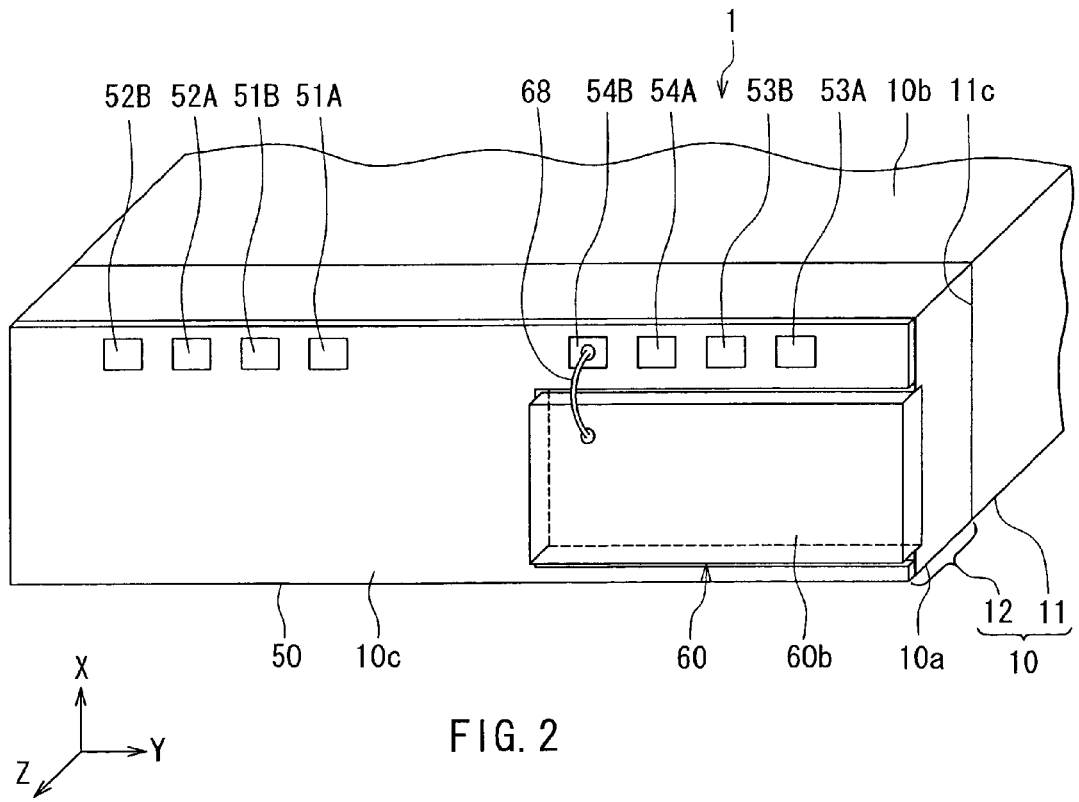
FIG. 2 is a perspective view of the main part of the heat-assisted magnetic recording head shown in FIG. 1.
Figure 3:
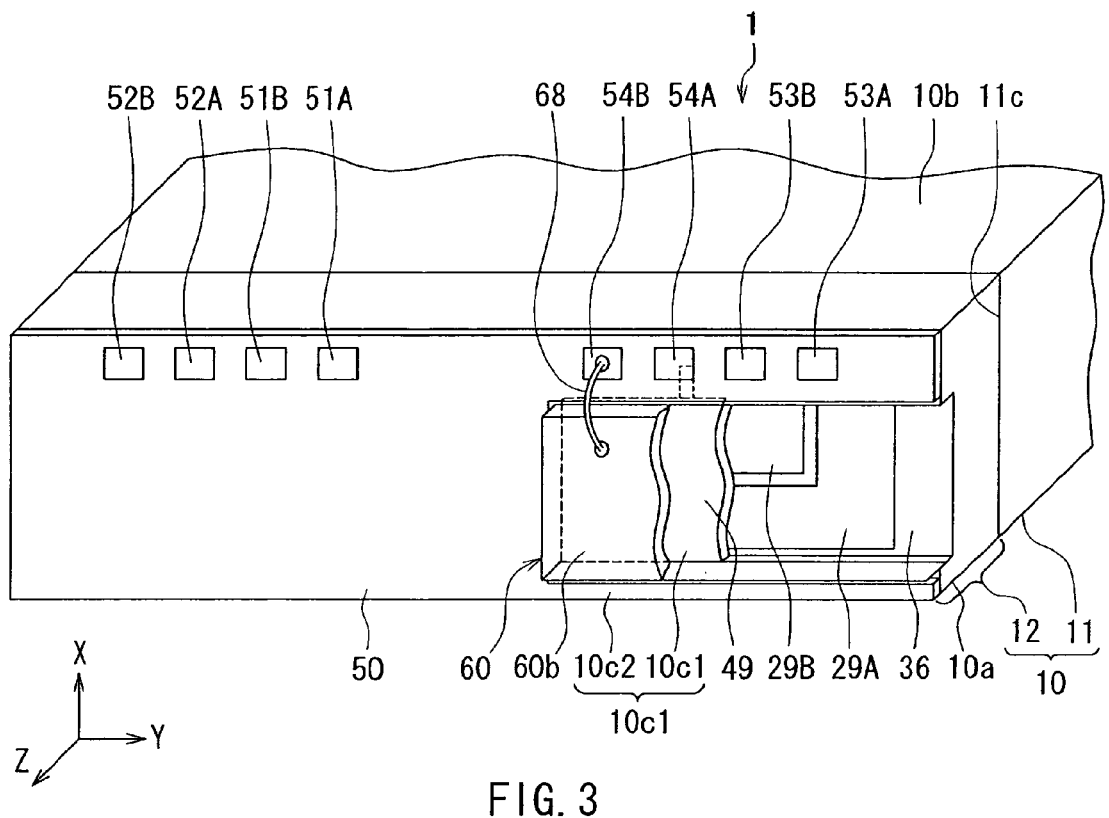
FIG. 3 is a partially cut-away perspective view of the main part of the heat-assisted magnetic recording head shown in FIG. 2.
Figure 4:
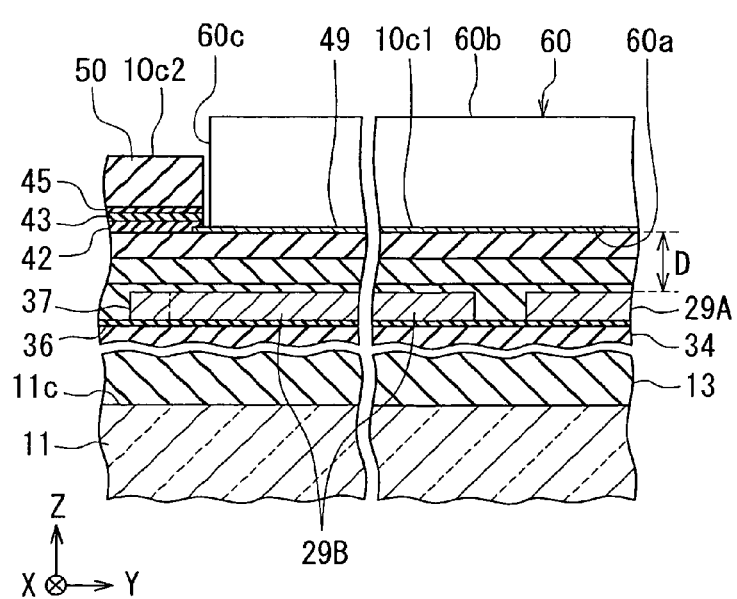
FIG. 4 is a cross-sectional view showing a part of the heat-assisted magnetic recording head taken along line 4-4 of FIG. 1.

FIG. 1 is an explanatory diagram showing the layout of the main part of the heat-assisted magnetic recording head 1. FIG. 2 is a perspective view of the main part of the heat-assisted magnetic recording head 1 shown in FIG. 1. FIG. 3 is a partially cut-away perspective view of the main part of the heat-assisted magnetic recording head 1 shown in FIG. 2. FIG. 4 is a cross-sectional view showing a part of the heat-assisted magnetic recording head 1 taken along line 4-4 of FIG. 1.

As shown in FIG. 2 and FIG. 3, the slider 10 includes a substrate 11 and a head unit 12. The substrate 11 is rectangular-solid-shaped and is made of a ceramic material such as aluminum oxide-titanium carbide ($Al_2O_3$—TiC). The substrate 11 has a top surface 11c. The top surface 11c is perpendicular to the medium facing surface 10a. The head unit 12 is integrated on the top surface 11c of the substrate 11. The medium facing surface 10a is processed so as to obtain an appropriate flying height of the slider 10 with respect to the magnetic disk 201. The slider 10 has a top surface 10c that lies at an end above the top surface 11c of the substrate 11. The top surface 10c is one of the four surfaces of the slider 10 that connect the medium facing surface 10a to the rear surface 10b. FIG. 2 and FIG. 3 show the heat-assisted magnetic recording head 1 placed so that the top surface 10c faces toward the viewer. In FIG. 1, some of the components of the head unit 12 located at levels lower than the top surface 10c are drawn in solid lines for the sake of convenience.

Where the components of the head unit 12 and the laser diode 60 are concerned, with respect to a reference position, a position located in a direction that is perpendicular to the top surface 11c of the substrate 11 and gets away from the top surface 11c is defined as "above", whereas a position located in a direction opposite to the foregoing direction is defined as "below". Where the components of the head unit 12 and the laser diode 60 are concerned, the surface closer to the top surface 11c is defined as a "bottom surface," and the surface farther from the top surface 11c as a "top surface". Moreover, X direction, Y direction, Z direction, −X direction, −Y direction and −Z direction will be defined as follows. The X direction is a direction perpendicular to the medium facing surface 10a and heading from the medium facing surface 10a toward the rear surface 10b. The Y direction is a direction parallel to the medium facing surface 10a and the top surface 11c of the substrate 11 and heading toward the right in FIG. 2. The Z direction is a direction perpendicular to the top surface 11c of the substrate 11 and getting away from the top surface 11c. The −X direction, the −Y direction and the −Z direction are opposite to the X direction, the Y direction and the Z direction, respectively. As viewed from the slider 10, the magnetic disk 201 moves in the Z direction. The slider 10 has an air inflow end (a leading end) at the end of the medium facing surface 10a in the −Z direction. The slider 10 has an air outflow end (a trailing end) at the end of the medium facing surface 10a in the Z direction. A track width direction is a direction parallel to the Y direction.

As shown in FIG. 2 and FIG. 3, the head unit 12 includes an overcoat layer 50 which is an uppermost layer of the head unit 12. The overcoat layer 50 is provided to cover a part of the top surface of the head unit 12 excluding the overcoat layer 50. Thus, as shown in FIG. 3, the top surface 10c of the slider 10 has a first part 10c1 that is not covered with the overcoat layer 50, and a second part 10c2 that is formed by the top surface of the overcoat layer 50. The second part 10c2 is located farther from the top surface 11c of the substrate 11 than is the first part 10c1. The laser diode 60 is disposed on the first part 10c1.

The head unit 12 further includes a plurality of pad-shaped terminals arranged on the top surface of the overcoat layer 50. FIG. 1 to FIG. 3 show an example in which the head unit 12 has eight terminals 51A, 51B, 52A, 52B, 53A, 53B, 54A, and 54B.

Figure 8:
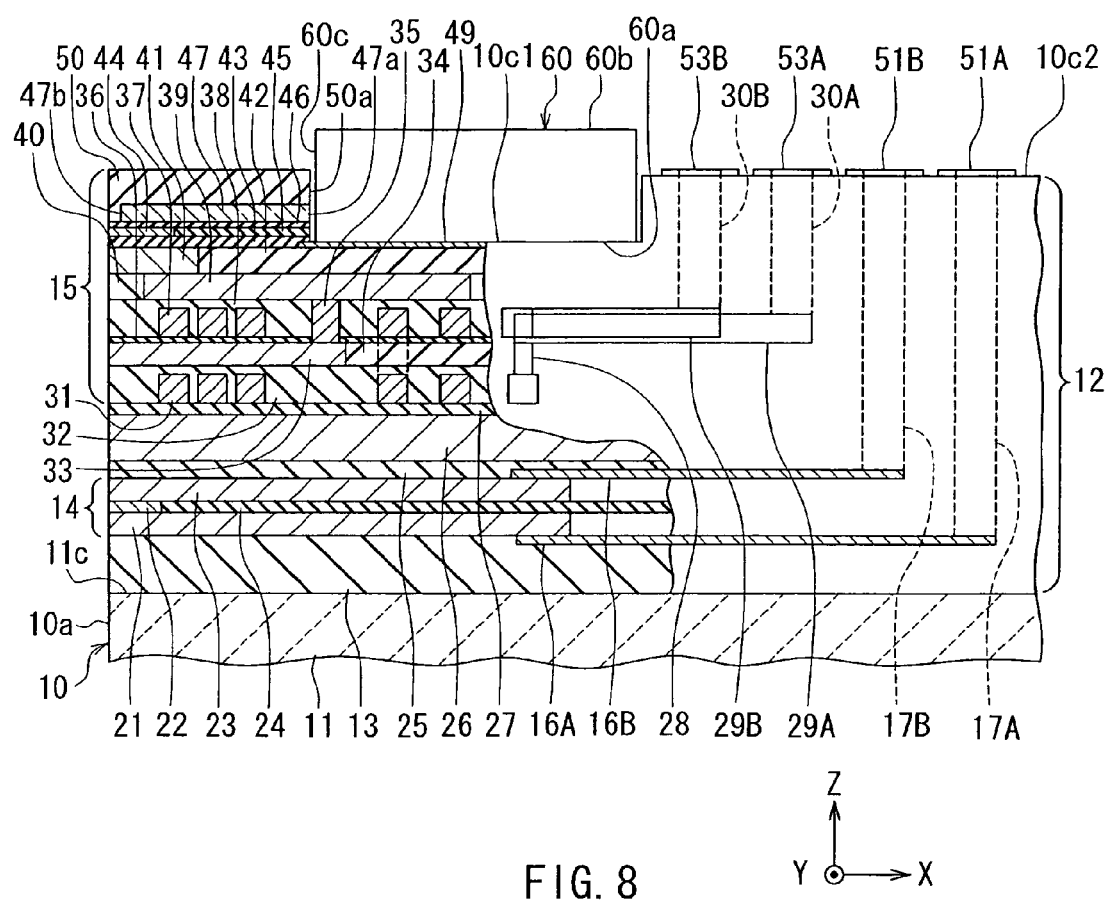
FIG. 8 is an explanatory diagram showing the general configuration of the heat-assisted magnetic recording head according to the embodiment of the invention.

FIG. 8 is an explanatory diagram showing the general configuration of the heat-assisted magnetic recording head 1. For the sake of convenience, FIG. 8 shows some of the components of the head unit 12 in shapes and layout different from those in the actual configuration. The X, Y, and Z directions shown in FIG. 8 apply only to the vicinity of the medium facing surface 10a.

As shown in FIG. 8, the head unit 12 includes an insulating layer 13 disposed on the top surface 11c of the substrate 11, and a reproducing head 14 and a recording head 15 that are stacked on the insulating layer 13 in this order. The insulating layer 13 is made of an insulating material such as $Al_2O_3$ (hereinafter, also referred to as alumina).

The reproducing head 14 includes: a lower shield layer 21 disposed on the insulating layer 13; a magnetoresistive (MR) element 22 that is disposed on the lower shield layer 21 and detects a magnetic signal sent from the magnetic disk 201; an upper shield layer 23 disposed on the MR element 22; and an insulating layer 24 disposed around the MR element 22 between the lower shield layer 21 and the upper shield layer 23. The lower shield layer 21 and the upper shield layer 23 are each made of a soft magnetic material. The insulating layer 24 is made of an insulating material such as alumina.

An end of the MR element 22 is located in the medium facing surface 10a. The MR element may be a GMR element or a TMR element, for example. The GMR element may be of either the current-in-plane (CIP) type in which a sense current for magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element.

If the MR element 22 is a TMR element or a CPP-type GMR element, the lower shield layer 21 and the upper shield layer 23 may also function as electrodes for feeding the sense current to the MR element 22. FIG. 8 shows an example in which the MR element 22 is a TMR element or a CPP-type GMR element. In this example, the head unit 12 further includes: a reproduction wiring layer 16A having an end electrically connected to the lower shield layer 21; a reproduction wiring layer 16B having an end electrically connected to the upper shield layer 23; a connecting part 17A that electrically connects the other end of the reproduction wiring layer 16A to the terminal 51A; and a connecting part 17B that electrically connects the other end of the reproduction wiring layer 16B to the terminal 51B. The reproduction wiring layers 16A and 16B supply the MR element 22 with a sense current for magnetic signal detection. The reproduction wiring layers 16A and 16B and the connecting parts 17A and 17B are each made of a conductive material, particularly a metal material such as Cu. Each of the connecting parts 17A and 17B is formed by stacking a plurality of conductor layers of columnar shape. The terminals 51A and 51B correspond to the reproduction terminals of the present invention.

If the MR element 22 is a CIP-type GMR element, insulating films are respectively provided between the MR element 22 and the lower shield layer 21 and between the MR element 22 and the upper shield layer 23, and two reproduction wiring layers for feeding the sense current to the MR element 22 are provided between these insulating films.

The head unit 12 further includes: an insulating layer 25 disposed on the upper shield layer 23; a middle shield layer 26 disposed on the insulating layer 25; and an insulating layer 27 disposed on the middle shield layer 26. The middle shield layer 26 has the function of shielding the MR element 22 from a magnetic field produced in the recording head 15. The insulating layers 25 and 27 are each made of an insulating material such as alumina. The middle shield layer 26 is made of a soft magnetic material. The insulating layer 25 and the middle shield layer 26 may be omitted.

The recording head 15 of the present embodiment is for use in perpendicular magnetic recording. The recording head 15 includes: a lower coil 31 disposed on the insulating layer 27; an insulating layer 32 covering the lower coil 31; a return magnetic pole layer 33 disposed on the insulating layer 32; and an insulating layer 34 disposed around the return magnetic pole layer 33 on the insulating layer 32. The recording head 15 further includes: a coupling layer 35 disposed on a part of the return magnetic pole layer 33 away from the medium facing surface 10a; an insulating layer 36 disposed around the coupling layer 35 on the return magnetic pole layer 33 and the insulating layer 34; an upper coil 37 disposed on the insulating layer 36; and an insulating layer 38 covering the upper coil 37. The top surface of the coupling layer 35 is exposed in the top surface of the insulating layer 38.

The recording head 15 further includes a yoke layer 39 disposed over the coupling layer 35 and the insulating layer 38; an insulating layer 40 disposed around the yoke layer 39 on the insulating layer 38; a magnetic pole 41 disposed on the yoke layer 39 and the insulating layer 40; and an insulating layer 42 disposed around the magnetic pole 41 on the yoke layer 39 and the insulating layer 40.

Each of the lower coil 31 and the upper coil 37 is made of a conductive material such as Cu. Each of the return magnetic pole layer 33, the coupling layer 35, the yoke layer 39 and the magnetic pole 41 is made of a soft magnetic material. Each of the insulating layers 32, 34, 36, 38, 40 and 42 is made of an insulating material such as alumina.

The lower coil 31 and the upper coil 37 are each planar spiral-shaped. The upper coil 37 is wound around the coupling layer 35. The inner end of the winding of the upper coil 37 is electrically connected to the inner end of the winding of the lower coil 31 through a not-shown connecting layer of columnar shape that penetrates through the insulating layers 36, 34 and 32. The lower coil 31 and the upper coil 37 are thereby connected in series. The lower coil 31 and the upper coil 37 are wound in the same direction of rotation from the outer end to the inner end. When an electric current is supplied to the lower coil 31 and the upper coil 37, the lower coil 31 and the upper coil 37 thus produce magnetic fields in opposite directions at their respective centers. The upper coil 37 produces a magnetic field corresponding to data to be recorded on the magnetic disk 201. The lower coil 31 produces a magnetic field that prevents the magnetic field produced by the upper coil 37 from affecting the reproducing head 14.

The recording head 15 further includes: a connecting layer 28 of columnar shape, with its bottom end electrically connected to the outer end of the lower coil 31; a recording wiring layer 29A having an end electrically connected to the top end of the connecting layer 28; a recording wiring layer 29B having an end electrically connected to the outer end of the upper coil 37; a connecting part 30A that electrically connects the other end of the recording wiring layer 29A to the terminal 53A; and a connecting part 30B that electrically connects the other end of the recording wiring layer 29B to the terminal 53B. The recording wiring layers 29A and 29B are disposed on the insulating layer 36. For the sake of convenience, FIG. 8 shows the recording wiring layer 29A at a position offset with respect to the recording wiring layer 29B. The recording wiring layers 29A and 29B supply the upper coil 37 with a coil current for production of the magnetic field corresponding to data. The connecting layer 28, the recording wiring layers 29A and 29B, and the connecting parts 30A and 30B are each made of a conductive material, particularly a metal material such as Cu. Each of the connecting parts 30A and 30B is formed by stacking a plurality of conductor layers of columnar shape. The terminals 53A and 53B correspond to the recording terminals of the present invention.

Each of the return magnetic pole layer 33 and the magnetic pole 41 has an end face located in the medium facing surface 10a. The yoke layer 39 has an end face that is closer to the medium facing surface 10a, and this end face is located at a distance from the medium facing surface 10a. The coupling layer 35 couples the return magnetic pole layer 33 and the yoke layer 39 to each other at a position away from the medium facing surface 10a. The return magnetic pole layer 33, the coupling layer 35, the yoke layer 39 and the magnetic pole 41 form a magnetic path for passing a magnetic flux corresponding to the magnetic field produced by the upper coil 37. The magnetic pole 41 produces a recording magnetic field for recording data on the magnetic disk 201 by means of the perpendicular magnetic recording system. The return magnetic pole layer 33 returns a magnetic flux that has been generated from the magnetic pole 41 and has magnetized the magnetic disk 201.

The recording head 15 further includes: an insulating layer 43 disposed over the magnetic pole 41 and the insulating layer 42; a near-field light generating element 44 disposed on the insulating layer 43; and an insulating layer 45 disposed around the near-field light generating element 44 on the insulating layer 43. The recording head 15 further includes: a buffer layer 46 disposed over the near-field light generating element 44 and the insulating layer 45; and a waveguide 47 disposed on the buffer layer 46.

The insulating layers 43 and 45 are each made of an insulating material such as alumina. The near-field light generating element 44 is made of a conductive material such as metal. For example, the near-field light generating element 44 may be made of one element selected from the group consisting of Pd, Pt, Rh, Ir, Ru, Au, Ag, Cu and Al, or an alloy composed of two or more of these elements.

Figure 10:
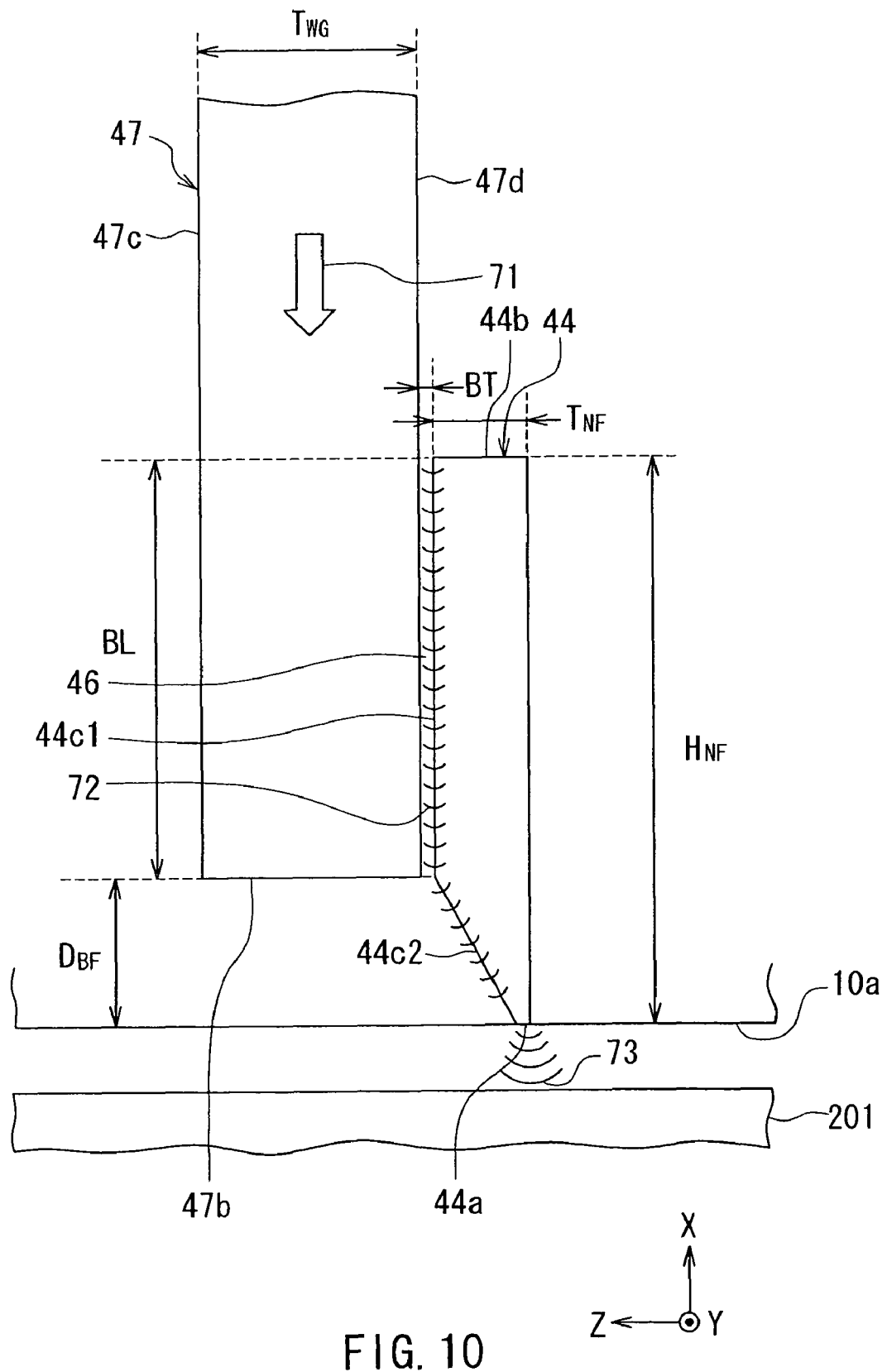
FIG. 10 is an explanatory diagram for explaining the principle of generation of near-field light by the heat-assisted magnetic recording head according to the embodiment of the invention.

The waveguide 47 is made of a dielectric material that transmits laser light emitted by the laser diode 60. The waveguide 47 has an outer surface. The outer surface includes an incident end face 47a, and an end face 47b that is closer to the medium facing surface 10a. While FIG. 10 shows an example in which the end face 47b is located at a distance from the medium facing surface 10a, the end face 47b may be located in the medium facing surface 10a.

Figure 9:
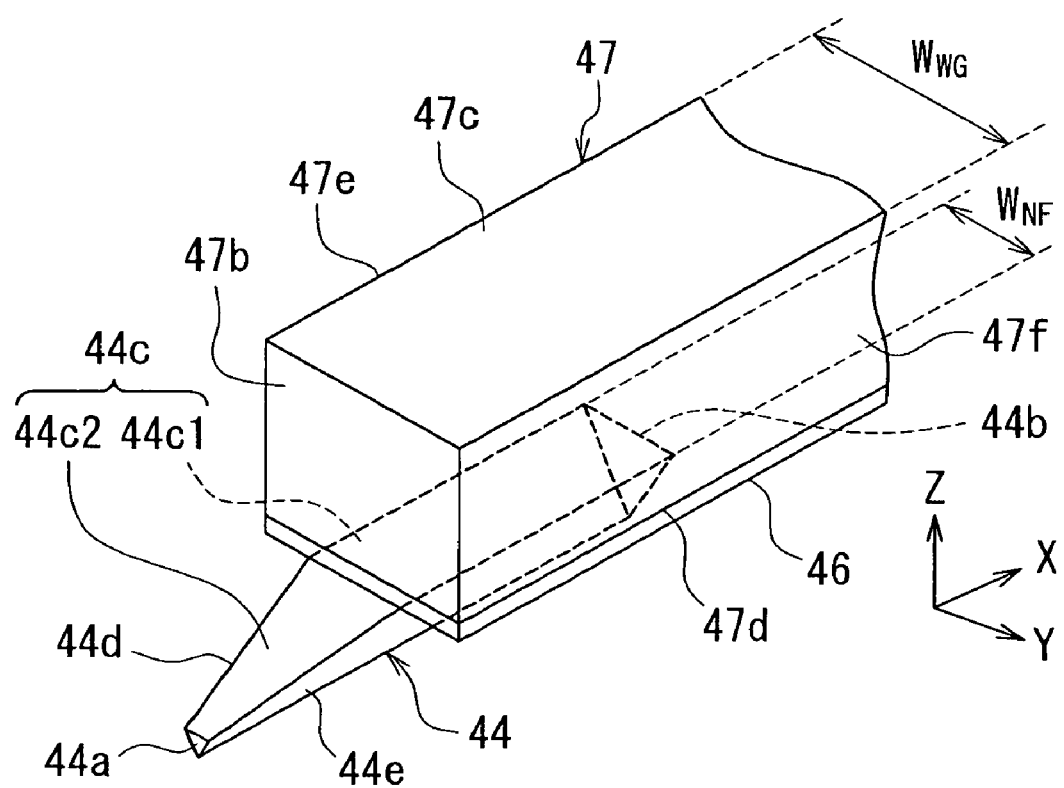
FIG. 9 is a perspective view showing a waveguide, a buffer layer and a near-field light generating element of the heat-assisted magnetic recording head according to the embodiment of the invention.

FIG. 9 is a perspective view showing the waveguide 47, the buffer layer 46 and the near-field light generating element 44 in the vicinity of the end face 47b. As shown in FIG. 9, the outer surface of the waveguide 47 further includes a top surface 47c, a bottom surface 47d, and two side surfaces 47e and 47f. The bottom surface 47d is in contact with the top surface of the buffer layer 46.

The recording head 15 further includes the overcoat layer 50 mentioned previously. The overcoat layer 50 is disposed on the buffer layer 46 and covers the outer surface of the waveguide 47 excluding the incident end face 47a and the bottom surface 47d. Each of the buffer layer 46 and the overcoat layer 50 is made of a dielectric material and has a refractive index lower than that of the waveguide 47. Consequently, the waveguide 47 excluding the incident end face 47a is covered with the dielectric material that is lower in refractive index than the wave guide 47. The buffer layer 46 and the overcoat layer 50 may be made of the same material or different materials. The buffer layer 46 and the overcoat layer 50 also function as clad layers for the wave guide 47.

As shown in FIG. 3 and FIG. 8, the slider 10 includes a conductive layer 49 disposed on the top surface of the insulating layer 42 in the area where the laser diode 60 is to be disposed. The conductive layer 49 is made of a conductive material such as Au. The conductive layer 49 constitutes at least a part of the first part 10c1 of the top surface 10c of the slider 10. The laser diode 60 is disposed on the conductive layer 49. The slider 10 further includes a not-shown connecting part of columnar shape that electrically connects the conductive layer 49 to the terminal 54A. The connecting part is made of Cu, for example.

Although not shown, the recording head 15 may further include a heater for heating the components of the recording head 15 including the magnetic pole 41 so as to control the distance between the magnetic recording medium 201 and the end face of the magnetic pole 41 located in the medium facing surface 10a. The heater is electrically connected to the terminals 52A and 52B.

Figure 5:
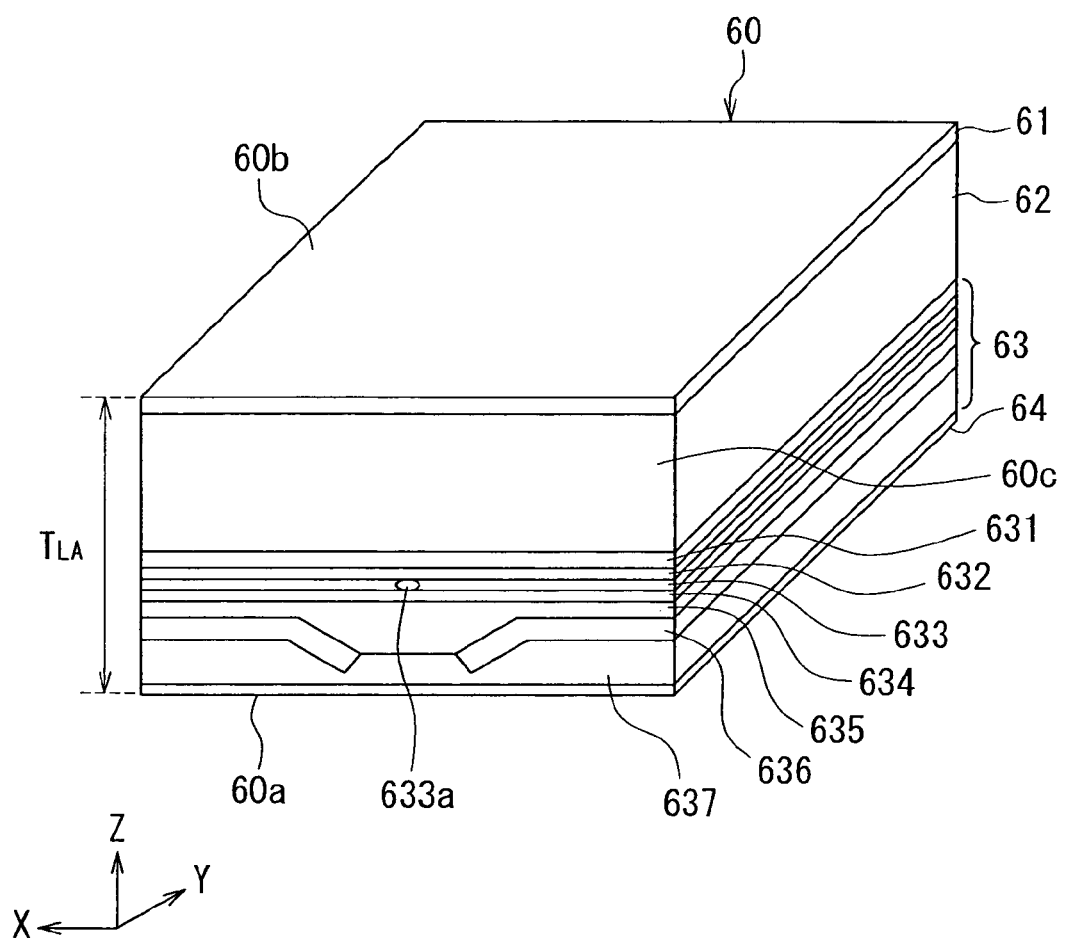
FIG. 5 is a perspective view showing a laser diode of the embodiment of the invention.

An example of the configuration of the laser diode 60 will now be described with reference to FIG. 5. The laser diode 60 shown in FIG. 5 is rectangular-solid-shaped, having a bottom surface 60a, a top surface 60b, and four surfaces that connect the top and bottom surfaces 60a and 60b to each other. One of the four surfaces that connect the top and bottom surfaces 60a and 60b to each other is the emitting end face 60c.

The laser diode 60 includes: an n-substrate 62 having two surfaces that face toward opposite directions; an n-electrode 61 joined to one of the two surfaces of the n-substrate 62; a laser structure part 63 integrated on the other of the two surfaces of the n-substrate 62; and a p-electrode 64 joined to the laser structure part 63 such that the laser structure part 63 is sandwiched between the p-electrode 64 and the n-substrate 62.

In the example shown in FIG. 5, the laser structure part 63 includes an n-clad layer 631, an n-guide layer 632, an active layer 633, a p-guide layer 634, a p-clad layer 635, an n-current blocking layer 636, and a p-contact layer 637 arranged in this order as viewed from the n-substrate 62. The active layer 633 has a surface that faces the n-guide layer 632, and a surface that faces the p-guide layer 634. The n-current blocking layer 636 has an opening of stripe shape that extends in one direction. The p-clad layer 635 is in contact with the p-contact layer 637 in the opening. With such a configuration, a current path of stripe shape extending in one direction is formed in the laser structure part 63. As a result, in the laser structure part 63, light propagates through a narrow area of stripe shape extending in one direction. The laser diode of this type is referred to as a stripe laser. Note that the laser diode 60 has only to be of an edge-emitting type, and is not structurally limited to the configuration shown in FIG. 5.

The laser diode 60 is arranged so that the bottom surface 60a faces the first part 10c1 of the top surface 10c of the slider 10. In particular, in the present embodiment, the laser diode 60 is arranged so that the p-electrode 64 faces the first part 10c1 of the top surface 10c of the slider 10. At least a part of the bottom surface 60a of the laser diode 60 is thus formed by the bottom (surface) of the p-electrode 64, and at least a part of the top surface 60b of the laser diode 60 is formed by the top (surface) of the n-electrode 61. The bottom surface 60a and the top surface 60b are at opposite ends in a direction perpendicular to the plane of the active layer 633. The emitting end face 60c lies at an end in a direction parallel to the plane of the active layer 633, or more specifically at one of ends in the direction in which the current path of stripe shape extends. The emitting end face 60c includes an emission part 633a that lies at the end of the active layer 633 and emits laser light. The laser light emitted from the emission part 633a is preferably polarized light of TM mode whose electric field oscillates in the direction perpendicular to the plane of the active layer 633. Note that FIG. 5 shows the case where the entire bottom surface 60a is formed by the bottom surface of the p-electrode 64, and the entire top surface 60b is formed by the top surface of the n-electrode 61. Nevertheless, the bottom surface 60a may be partly formed by the bottom surface of the p-electrode 64, and the top surface 60b may be partly formed by the top surface of the n-electrode 61.

The incident end face 47a of the waveguide 47 is opposed to the emission part 633a. The first part 10c1 and the second part 10c2 of the top surface 10c of the slider 10 have a difference in level therebetween. The difference is necessary to align the position of the emission part 633a with that of the incident end face 47a of the waveguide 47 in the Z direction. The distance between the emission part 633a and the surface of the p-electrode 64 is smaller than the distance between the emission part 633a and the surface of the n-electrode 61. This makes it possible that, when the laser diode 60 is situated so that the p-electrode 64 faces the first part 10c1 of the top surface 10c of the slider 10, the difference in level between the first part 10c1 and the second part 10c2 of the top surface 10c of the slider 10 is smaller as compared with the case where the laser diode 60 is situated so that the n-electrode 61 faces the first part 10c1.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example. The laser diode 60 has a thickness $T_{LA}$ of around 60 to 200 μm, for example.

The conductive layer 49 is in contact with and electrically connected to the p-electrode 64. The p-electrode 64 is thereby electrically connected to the terminal 54A via the conductive layer 49. As shown in FIG. 2, the n-electrode 61 which forms the top surface 60b of the laser diode 60 is electrically connected to the terminal 54B with a bonding wire 68, for example. When a voltage for driving the laser diode 60 is applied to the terminals 54A and 54B, the voltage is supplied to the laser diode 60 via the conductive layer 49 and the bonding wire 68. Laser light is thereby emitted from the emission part 633a of the laser diode 60.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

As shown in FIG. 1, the laser diode 60 is arranged so that the emitting end face 60c is parallel to the XZ plane and the laser light emitted from the emission part 633a travels in the −Y direction. The incident end face 47a of the waveguide 47 is opposed to the emission part 633a of the laser diode 60. The waveguide 47 has a curved shape so that the direction of travel of the laser light that has traveled in the −Y direction and entered the waveguide 47 from the incident end face 47a is turned to the −X direction.

As shown in FIG. 8, the overcoat layer 50 has an end face 50a that faces the emitting end face 60c of the laser diode 60. The emitting end face 60c of the laser diode 60 is positioned to leave a gap from the incident end face 47a of the waveguide 47 and the end face 50a of the overcoat layer 50.

In the present embodiment, as shown in FIG. 1, the laser diode 60 does not overlap the two reproduction wiring layers 16A and 16B but overlaps at least one of the two recording wiring layers 29A and 29B as viewed from above. According to the present embodiment, it is thus possible to transfer the heat generated by the laser diode 60 to the substrate 11 effectively while hindering the heat generated by the laser diode 60 from reaching the MR element 22. This advantageous effect will be described in detail later. Note that FIG. 1 shows an example in which the laser diode 60 overlaps both of the two recording wiring layers 29A and 29B as viewed from above.

As shown in FIG. 1, the overlapping portions of the recording wiring layers 29A and 29B with the laser diode 60 as viewed from above have respective widths $W_{WA}$ and $W_{WB}$ that are greater than the widths $W_{RA}$ and $W_{RB}$ of the reproduction wiring layers 16A and 16B. This facilitates the transfer of the heat generated by the laser diode 60 to the substrate 11 and thus enhances the above-mentioned advantageous effect as compared with the case where the recording wiring layers 29A and 29B have widths $W_{WA}$ and $W_{WB}$ that are equal to the widths $W_{RA}$ and $W_{RB}$ of the reproduction wiring layers 16A and 16B.

The relationship among the waveguide 47, the buffer layer 46 and the near-field light generating element 44 and the principle of generation of near-field light according to the present embodiment will now be described with reference to FIG. 9 and FIG. 10. FIG. 9 is a perspective view showing the waveguide 47, the buffer layer 46 and the near-field light generating element 44. FIG. 10 is an explanatory diagram for explaining the principle of generation of near-field light according to the present embodiment.

FIG. 9 shows an example of the shape of the near-field light generating element 44. The near-field light generating element 44 shown in FIG. 9 has a shape longer in the X direction. The outer surface of the near-field light generating element 44 includes: a first end face 44a that is located in the medium facing surface 10a; a second end face 44b that is farther from the medium facing surface 10a; and a connecting portion that connects the first end face 44a and the second end face 44b to each other. The connecting portion includes a top surface 44c, and two side surfaces 44d and 44e that decrease in distance from each other with decreasing distance to the top surface 11c of the substrate 11. The top surface 44c includes a coupling part 44c1 that extends from a midpoint between the first end face 44a and the second end face 44b to the second end face 44b, and a tapered part 44c2 that extends from the foregoing midpoint to the first end face 44a. The coupling part 44c1 is parallel to the XY plane. The tapered part 44c2 is inclined with respect to the XY plane such that the distance to the top surface 11c of the substrate 11 decreases toward the first end face 44a. Each of the first end face 44a and the second end face 44b is shaped like an isosceles triangle with its vertex downward. The first end face 44a has an area smaller than that of the second end face 44b. In the near-field light generating element 44 shown in FIG. 9, the first end face 44a constitutes a near-field light generating part that is located in the medium facing surface 10a and generates near-field light. The bottom surface 47d of the waveguide 47 is opposed to the coupling part 44c1 of the top surface 44c of the near-field light generating element 44 with the buffer layer 46 interposed therebetween.

The maximum width $W_{NF}$ (see FIG. 9) of the near-field light generating element 44 in the track width direction (Y direction) and the maximum thickness (dimension in the Z direction) $T_{NF}$ (see FIG. 10) of the near-field light generating element 44 are both sufficiently smaller than the wavelength of laser light 71 (see FIG. 10) that is emitted from the laser diode 60 and propagates through the waveguide 47. $W_{NF}$ falls within the range of 100 to 300 nm, for example. $T_{NF}$ falls within the range of 60 to 150 nm, for example. The near-field light generating element 44 has a length $H_{NF}$ (see FIG. 10) in the X direction of, for example, 0.5 to 3 μm.

In the vicinity of the near-field light generating element 44, the wave guide 47 has a width $W_{WG}$ (see FIG. 9) in the track width direction (Y direction) of, for example, 0.3 to 1 μm. In the vicinity of the near-field light generating element 44, the waveguide 47 has a thickness (dimension in the Z direction) $T_{WG}$ (see FIG. 10) of, for example, 0.1 to 1 μm. The distance $D_{BF}$ between the end face 47b of the waveguide 47 and the medium facing surface 10a falls within the range of 0 to 2.0 μm, for example.

As shown in FIG. 10, the distance between the bottom surface 47d of the waveguide 47 and the coupling part 44c1 of the near-field light generating element 44 that are opposed to each other with the buffer layer 46 therebetween will be denoted by the symbol BT. The distance BT falls within the range of 20 to 100 nm, for example. The length of the coupling part 44c1 will be denoted by BL. The length BL falls within the range of 0.5 to 3 µm, for example.

As described previously, each of the buffer layer 46 and the overcoat layer 50 has a refractive index lower than that of the waveguide 47. The buffer layer 46 and the overcoat layer 50 may be made of the same material or different materials. For example, if the wavelength of the laser light 71 is 600 nm and the waveguide 47 is made of $Al_2O_3$ (refractive index n=1.63), the buffer layer 46 and the overcoat layer 50 may be made of $SiO_2$ (refractive index n=1.46). If the waveguide 47 is made of tantalum oxide such as $Ta_2O_5$ (n=2.16), the buffer layer 46 and the overcoat layer 50 may be made of $SiO_2$ (n=1.46) or $Al_2O_3$ (n=1.63).

Reference is now made to FIG. 10 to describe the principle of generation of near-field light and the principle of heat-assisted magnetic recording using the near-field light. The laser light 71 emitted from the laser diode 60 propagates through the waveguide 47 to reach the vicinity of the buffer layer 46. Here, the laser light is totally reflected at the interface between the waveguide 47 and the buffer layer 46, and this generates evanescent light permeating into the buffer layer 46. Then, this evanescent light and fluctuations of charges on the coupling part 44c1 of the top surface 44c of the near-field light generating element 44 are coupled with each other to induce a surface plasmon polariton mode, whereby surface plasmons 72 are excited on the coupling part 44c1.

The surface plasmons 72 excited on the coupling part 44c1 propagate along the tapered part 44c2 of the top surface 44c of the near-field light generating element 44 to reach the near-field light generating part (the end face 44a). As a result, the surface plasmons 72 concentrate at the near-field light generating part (the end face 44a), and near-field light 73 thus occurs from the near-field light generating part (the end face 44a) based on the surface plasmons 72. The near-field light 73 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a recording magnetic field produced by the magnetic pole 41 for data recording.

The heat-assisted magnetic recording head 1 according to the present embodiment is capable of converting the laser light that propagates through the waveguide 47 into near-field light with higher light use efficiency, compared with the case where near-field light is generated from a plasmon antenna by directly irradiating the plasmon antenna with laser light. Consequently, according to the present embodiment, it is possible to prevent a part of the medium facing surface 10a from protruding due to conversion of the energy of the laser light into thermal energy in the heat-assisted magnetic recording head 1.

It should be noted that possible shapes of the near-field light generating element 44 are not limited to the one shown in FIG. 9. For example, the near-field light generating element 44 may be tetragonal-prism-shaped. In this case, the cross section of the near-field light generating element 44 parallel to the medium facing surface 10a may be rectangular, or may be trapezoidal such that the width decreases with decreasing distance to the top surface 11c of the substrate 11.

Figure 11:
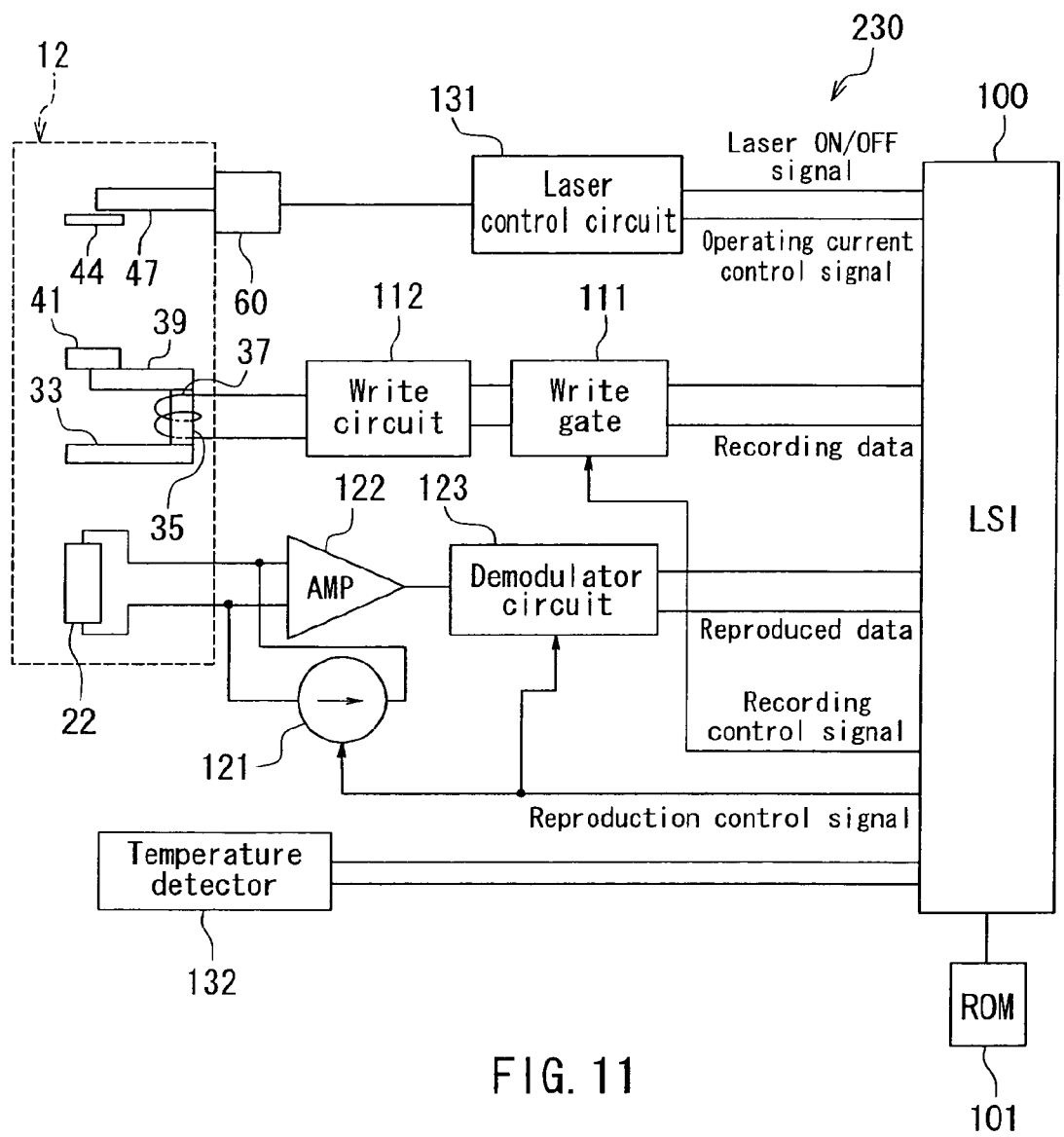
FIG. 11 is a block diagram showing the circuit configuration of the magnetic recording device according to the embodiment of the invention.

Reference is now made to FIG. 11 to describe the circuit configuration of the control circuit 230 shown in FIG. 6 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies recording data and a recording control signal to the write gate 111. The control LSI 100 supplies a reproduction control signal to the constant current circuit 121 and the demodulator circuit 123, and receives reproduced data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a recording operation, the control LSI 100 supplies recording data to the write gate 111. The write gate 111 supplies the recording data to the write circuit 112 only when the recording control signal indicates a recording operation. According to the recording data, the write circuit 112 passes a recording current through the coil 37. Consequently, the magnetic pole 41 produces a recording magnetic field and data is recorded on the magnetic recording layer of the magnetic disk 201 through the use of this recording magnetic field.

In a reproducing operation, the constant current circuit 121 supplies a certain sense current to the MR element 22 only when the reproduction control signal indicates a reproducing operation. The output voltage of the MR element 22 is amplified by the amplifier 122 and input to the demodulator circuit 123. When the reproduction control signal indicates a reproducing operation, the demodulator circuit 123 demodulates the output of the amplifier 122 to generate reproduced data, and supplies the reproduced data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light propagates through the waveguide 47. According to the principle of generation of near-field light described above, the near-field light 73 occurs from the near-field light generating part (the end face 44a) of the near-field light generating element 44. The near-field light 73 heats a part of the magnetic recording layer of the magnetic disk 201, thereby lowering the coercivity of that part. When recording, the part of the magnetic recording layer with the lowered coercivity is subjected to the recording magnetic field produced by the magnetic pole 41 for data recording.

On the basis of such factors as the temperature of the magnetic recording layer of the magnetic disk 201 measured by the temperature detector 132, the control LSI 100 consults the control table stored in the ROM 101 to determine the value of the operating current for the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 73, and data that indicates the temperature dependence of the coercivity of the magnetic recording layer.

As shown in FIG. 11, the control circuit 230 has the signal system for controlling the laser diode 60, i.e., the signal system consisting of the laser ON/OFF signal and the operating current control signal, independent of the control signal system intended for recording/reproducing operations. This configuration makes it possible to implement various modes of energization of the laser diode 60, not only to energize the laser diode 60 simply in association with a recording operation. It should be noted that possible circuit configurations of the control circuit 230 are not limited to the one shown in FIG. 11.

As has been described, in the heat-assisted magnetic recording head 1 according to the present embodiment, the edge-emitting laser diode 60 is fixed to the slider 10 such that the bottom surface 60a lying at an end in the direction perpendicular to the plane of the active layer 633 faces the top surface 10c of the slider 10. This makes it possible to align the position of the emission part 633a with respect to the incident end face 47a of the waveguide 47 in the Z direction easily with high precision. Consequently, according to the present embodiment, it is easy to align the emission part 633a with respect to the incident end face 47a of the waveguide 47 while using the edge-emitting laser diode 60 which has a high optical output.

In the present embodiment, as shown in FIG. 1, the laser diode 60 does not overlap the two reproduction wiring layers 16A and 16B but overlaps at least one of the two recording wiring layers 29A and 29B as viewed from above. The metal material constituting the recording wiring layers 29A and 29B, such as Cu, has a thermal conductivity higher than that of the insulating material constituting the insulating layer 38 around the recording wiring layers 29A and 29B, such as alumina. For example, alumina has a thermal conductivity of around 30 W/m·K, whereas Cu has a thermal conductivity of 398 W/m·K. Since the laser diode 60 overlaps at least one of the two recording wiring layers 29A and 29B as viewed from above and the at least one of the two recording wiring layers 29A and 29B is interposed in part between the bottom surface 60a of the laser diode 60 and the top surface 11c of the substrate 11, the heat generated by the laser diode 60 can be transferred to the substrate 11 more easily than in the case where the recording wiring layers 29A and 29B are not interposed at all between the bottom surface 60a and the top surface 11c. This can hinder the heat generated by the laser diode 60 from spreading in the head unit 12 in directions parallel to the top surface 11c of the substrate 11. As a result, it is possible to prevent the heat from reaching the MR element 22.

In the present embodiment, since the laser diode 60 does not overlap the two reproduction wiring layers 16A and 16B as viewed from above, it is possible to prevent the heat generated by the laser diode 60 from being transferred to the MR element 22 through the reproduction wiring layers 16A and 16B.

Consequently, according to the present embodiment, it is possible to prevent the MR element 22 from deteriorating in characteristics and suffering a decrease in life due to the heat generated by the laser diode 60. Such an advantageous effect is particularly significant in the case where the MR element 22 is a TMR element which can easily suffer a dielectric breakdown across its tunnel barrier layer when subjected to heat.

In the present embodiment, the overlapping portion of the at least one of the recording wiring layers 29A and 29B with the laser diode 60 as viewed from above has a width greater than that of each of the reproduction wiring layers 16A and 16B. This facilitates the transfer of the heat generated by the laser diode 60 to the substrate 11 and thus enhances the foregoing advantageous effect as compared with the case where the recording wiring layers 29A and 29B have widths equal to those of the reproduction wiring layers 16A and 16B.

To enhance the foregoing advantageous effect, the overlapping portion of the at least one of the two recording wiring layers 29A and 29B with the laser diode 60 as viewed from above desirably has an area equal to or greater than a half that of the bottom surface 60a of the laser diode 60.

In the present embodiment, the laser diode 60 includes the p-electrode 64 having a bottom surface which constitutes at least a part of the bottom surface 60a. The slider 10 includes the conductive layer 49 in contact with and electrically connected to the p-electrode 64. Since the laser diode 60 does not overlap the two reproduction wiring layers 16A and 16B as viewed from above, it is possible to avoid the occurrence of a stray capacitance between the reproduction wiring layers 16A, 16B and the conductive layer 49 which is in contact with and electrically connected to the p-electrode 64 of the laser diode 60. This can prevent the reproduction signal obtained by the MR element 22 from deteriorating in characteristics due to a stray capacitance. Such an advantageous effect is particularly significant in the case where the MR element 22 is a TMR element whose high-frequency characteristics can be easily degraded by a stray capacitance.

From the foregoing, according to the present embodiment, it is possible to transfer the heat generated by the laser diode 60 to the substrate 11 effectively while suppressing adverse effects of the laser diode 60 on the MR element 22. The heat transferred to the substrate 11 is then transferred from the substrate 11 to the magnetic disk 201. Much of the heat generated by the laser diode 60 is thereby released to the outside of the slider 10.

Now, as shown in FIG. 4, the distance between the overlapping portion of the at least one of the recording wiring layers 29A and 29B with the laser diode 60 as viewed from above and the conductive layer 49 which is in contact with and electrically connected to the p-electrode 64 of the laser diode 60 will be denoted by the symbol D. The distance D is desirably smaller, or 5 μm or less in particular, so that the heat generated by the laser diode 60 may be transferred to the at least one of the recording wiring layers 29A and 29B without much spreading in the head unit 12 in directions parallel to the top surface 11c of the substrate 11. If the distance D is too small, on the other hand, the insulation performance between the conductive layer 49 and the at least one of the recording wiring layers 29A and 29B may be affected. The distance D is thus preferably 1 μm or greater.

The present invention is not limited to the foregoing embodiment, and various modifications may be made thereto. For example, in the foregoing embodiment, the end face 44a of the near-field light generating element 44 is located in the medium facing surface 10a at a position forward of the end face of the magnetic pole 41 along the Z direction (in other words, located closer to the trailing end). However, the end face 44a of the near-field light generating element 44 may be located backward of the end face of the magnetic pole 41 along the Z direction (in other words, located closer to the leading end) in the medium facing surface 10a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A heat-assisted magnetic recording head comprising a slider, and an edge-emitting laser diode fixed to the slider, the slider comprising:
    a medium facing surface that faces a magnetic recording medium;
    a magnetoresistive element that detects a magnetic signal sent from the magnetic recording medium;
    two reproduction wiring layers that supply the magnetoresistive element with a sense current for detection of the magnetic signal;
    a coil that produces a magnetic field corresponding to data to be recorded on the magnetic recording medium;
    two recording wiring layers that supply the coil with a coil current for production of the magnetic field corresponding to the data;
    a magnetic pole that has an end face located in the medium facing surface, allows a magnetic flux corresponding to the magnetic field produced by the coil to pass, and produces a recording magnetic field for recording the data on the magnetic recording medium;
    a waveguide that allows propagation of light emitted from the laser diode;
    a near-field light generating element that has a near-field light generating part located in the medium facing surface, a surface plasmon being excited based on the light that propagates through the waveguide, the surface plasmon propagating to the near-field light generating part, the near-field light generating part generating near-field light based on the surface plasmon; and
    a substrate having a top surface, the magnetoresistive element, the reproduction wiring layers, the coil, the recording wiring layers, the magnetic pole, the near field light generating element, and the waveguide being stacked above the top surface of the substrate, wherein:
    the slider has a top surface that lies at an end above the top surface of the substrate;
    the laser diode includes: an active layer; an emitting end face that lies at an, end in a direction parallel to a plane of the active layer and includes an emission part for emitting laser light; and a bottom surface that lies at an end in a direction perpendicular to the plane of the active layer, the laser diode being arranged so that the bottom surface faces the top surface of the slider; and
    as viewed in a direction perpendicular to the top surface of the slider, the laser diode does not overlap the two reproduction wiring layers but overlaps at least one of the two recording wiring layers.

2. The heat-assisted magnetic recording head according to claim 1, wherein an overlapping portion of the at least one of the two recording wiring layers with the laser diode as viewed in the direction perpendicular to the top surface of the slider has a width greater than that of each of the two reproduction wiring layers, 3. The heat-assisted magnetic recording head according to claim 1, wherein an overlapping portion of the at least one of the two recording wiring layers with the laser diode as viewed in the direction perpendicular to the top surface of the slider has an area equal to or greater than a half that of the bottom surface of the laser diode.

4. The heat-assisted magnetic recording head according to claim 1, wherein the magnetoresistive element is a tunneling magnetoresistive element.

5. The heat-assisted magnetic recording head according to claim 1, wherein the laser diode further includes an electrode that has a bottom surface constituting at least a part of the bottom surface of the laser diode, and the slider further comprises a conductive layer that is in contact with and electrically connected to the electrode.

6. The heat-assisted magnetic recording head according to claim 1, wherein the slider further comprises: two reproduction terminals that are disposed on the top surface of the slider and electrically connected to the two reproduction wiring layers; and two recording terminals that are disposed on the top surface of the slider and electrically connected to the two recording wiring layers.

7. The heat-assisted magnetic recording head according to claim 1, wherein the waveguide has an incident end face opposed to the emission part of the laser diode.

8. The heat-assisted magnetic recording head according to claim 1, wherein:
    the waveguide has an outer surface;
    the near-field light generating element has a coupling part opposed to the outer surface of the waveguide;
    the slider further comprises a buffer layer that has a refractive index lower than that of the waveguide and is interposed between the coupling part and the outer surface of the waveguide; and
    a surface plasmon is excited on the coupling part through coupling with evanescent light occurring from an interface between the waveguide and the buffer layer, the surface plasmon propagates to the near-field light generating part, and the near-field light generating part generates the near-field light based on the surface plasmon.

9. A head gimbal assembly comprising: the heat-assisted magnetic recording head according to claim 1; and a suspension that supports the heat-assisted magnetic recording head.

10. A magnetic recording device comprising: a magnetic recording medium; the heat-assisted magnetic recording head according to claim 1; and a positioning device that supports the heat-assisted magnetic recording head and positions the heat-assisted magnetic recording head with respect to the magnetic recording medium.

* * * * *

UNITED STATES PATENT AND TRADEMARK OFFICE
CERTIFICATE OF CORRECTION

| | | |
|---|---|---|
| PATENT NO. | : 8,111,591 B2 | Page 1 of 1 |
| APPLICATION NO. | : 12/458954 | |
| DATED | : February 7, 2012 | |
| INVENTOR(S) | : Shimazawa et al. | |

It is certified that error appears in the above-identified patent and that said Letters Patent is hereby corrected as shown below:

Title page

Please delete the following:

"(54) HEAT-ASSISTED MAGNETIC RECORDING HEAD HAVING LASER DIODE
    OVERLAPING TWO RECORDING WIRING LAYERS"

And Replace with:

--(54) HEAT-ASSISTED MAGNETIC RECORDING HEAD HAVING LASER DIODE
    OVERLAPPING TWO RECORDING WIRING LAYERS--

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,111,591 B2 | Page 1 of 1 |
| APPLICATION NO. | : 12/458954 | |
| DATED | : February 7, 2012 | |
| INVENTOR(S) | : Shimazawa et al. | |

It is certified that error appears in the above-identified patent and that said Letters Patent is hereby corrected as shown below:

Title page, Item (54) and at Column 1, lines 1-3, Title,

Please delete the following:

"HEAT-ASSISTED MAGNETIC RECORDING HEAD HAVING LASER DIODE OVERLAPING TWO RECORDING WIRING LAYERS"

And Replace with:

--HEAT-ASSISTED MAGNETIC RECORDING HEAD HAVING LASER DIODE OVERLAPPING TWO RECORDING WIRING LAYERS--

This certificate supersedes the Certificate of Correction issued May 15, 2012.

Signed and Sealed this
Twelfth Day of June, 2012

David J. Kappos
*Director of the United States Patent and Trademark Office*